United States Patent [19]
Vidic et al.

[11] 3,919,047
[45] Nov. 11, 1975

[54] MICROBIOLOGICAL HYDROXYLATION OF 2,6-METHANO-3-BENZAZOCINES

[75] Inventors: Hans-Jörg Vidic; Klaus Kieslich, both of Berlin, Germany

[73] Assignee: Schering Aktiengesellschaft, Berlin and Bergkamen, Germany

[22] Filed: July 26, 1974

[21] Appl. No.: 492,233

[30] Foreign Application Priority Data
July 26, 1973 Germany............................ 2338369

[52] U.S. Cl................. 195/51 R; 424/256; 195/30
[51] Int. Cl.²........................................ C12D 13/02
[58] Field of Search........................... 195/51 R, 30

[56] References Cited
UNITED STATES PATENTS
3,453,179  7/1969  Greenspan et al. ............... 195/51 R Primary Examiner—Alvin E. Tanenholtz
Attorney, Agent, or Firm—Millen, Raptes & White

[57] ABSTRACT

2,6-Methano-3-benzazocines of the formula

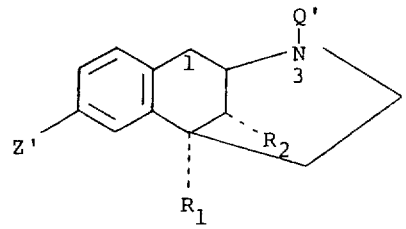

wherein $Q'$ is a benzoyl group, $R_1$ and $R_2$ each are a hydrogen atom or lower alkyl and $Z'$ is a free, etherified or esterified hydroxy group, are hydroxylated in the 1-position by microorganisms of the family Agaricaceae, e.g., *Pellicularia filamentosa* f. sp. *sasakii*.

6 Claims, No Drawings

MICROBIOLOGICAL HYDROXYLATION OF 2,6-METHANO-3-BENZAZOCINES

BACKGROUND OF THE INVENTION

This invention relates to a process for the hydroxylation of 2,6-methano-3-benzazocines.

Belgian Pat. No. 768,084 describes 2,6-methano-3-benzazocines of the general Formula I

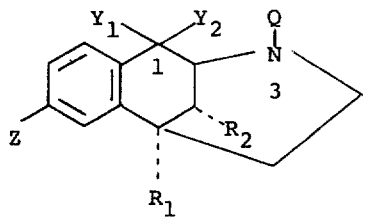

I wherein, inter alia, $Y_1$ is a free or esterified hydroxy group and $Y_2$ is a hydrogen atom, alkyl, aryl, or aralkyl or $Y_1$ and $Y_2$ collectively are an oxygen atom; Q is alkyl, cycloalkyl, or acyl; $R_1$ and $R_2$ each are a hydrogen atom or lower alkyl; and Z is a hydrogen atom or a free or esterified hydroxy group.

The compounds of general Formula I are described as central nervous system depressants, especially analgesics and analgesic antagonists, e.g., of meperidine and morphine.

The compounds of general Formula I are produced, according to the Belgian patent, from corresponding compounds wherein $Y_1$ and $Y_2$ are hydrogen atoms by chromic acid oxidation and subsequent reduction, or reaction with alkyl magnesium halides of the first-formed oxo compounds ($Y_1$ and $Y_2$= O).

Subsequent reactions can follow the hydroxylation in the 1-position, e.g., if Q is a hydrogen atom, an N-alkylation or N-acylation can be effected, or a tetrahydrooxazolone ring can formed with phosgene via the OH— and NH-groups:

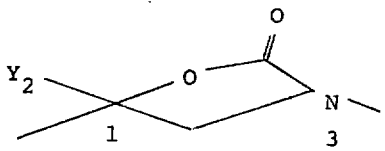

The 1-hydroxylation by a chemical method has the disadvantage that the phenolic hydroxy group (Z = OH) must be blocked as a methyl ether before the oxidation. If compounds are desired wherein Z is a free hydroxy group, the hydroxy group must be liberated again after the oxidation, employing drastic methods. During this process, very low yields must be tolerated. A further disadvantage is that chemical hydroxylation requires two reaction steps.

It is an object of this invention to provide a process which avoids the above-discussed disadvantages.

It has now been found that the 1β-hydroxy group can be introduced in one step microbiologically employing benzazocines whose N-atom bears a benzoyl group. Masking of the phenolic hydroxy group is unnecessary in this process.

SUMMARY OF THE INVENTION

According to this invention, compounds of general Formula II

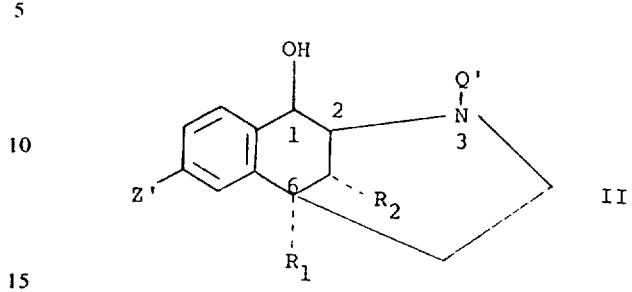

II wherein Q' is optionally substituted benzoyl; $R_1$ and $R_2$ each are a hydrogen atom or lower alkyl, and Z' is a free, etherified, or esterified hydroxy group, are prepared by subjecting a compound of general Formula III

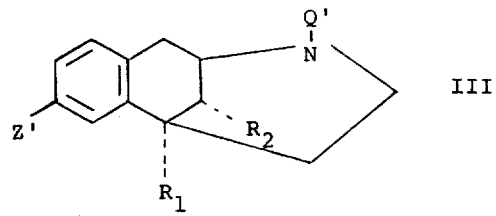

III wherein Q', $R_1$, $R_2$, and Z' have the values given for Formula II, to the hydroxylating activity of a hydroxylating microorganism of the family Agaricaceae.

DETAILED DISCUSSION

Suitable hydroxylating microorganisms of the family Agaricaceae are those of the genus Pellicularia, especially *P. filamentosa* f. sp. sasakii (ATCC 13 289).

Preferred starting compounds are those wherein:

a. $R_1$ and/or $R_2$ are lower alkyl, i.e., of 1–4 carbon atoms, e.g., methyl, ethyl, propyl, butyl, preferably methyl, especially those wherein either or both $R_1$ and $R_2$ are methyl;

b. Z is HO—, especially those of (a); and c. Q' is unsubstituted benzoyl, esp. those of (a) and (b).

Generally, the starting compounds contain an unsubstituted 3-benzoyl group. However, as will be apparent to those skilled in the art, the hydroxylation of this invention can also be accomplished when the benzoyl group is substituted. Thus, the term "benzoyl" as used herein contemplates the presence on the ring of one or more simple substituents, e.g., halogen atoms, preferably chloro, lower alkyl or alkoxy. Other possible substituents are nitro, amido, carbamido, trifluoromethyl, acetyl and lower-alkylsulfonyl. It will also be apparent that compounds of Formula III wherein Q' is another acyl group, are equivalents as starting compounds for the process of this invention.

Although Z' is preferably a free hydroxy group, it can also be an etherified or esterified hydroxy group, the exact nature of the group being immaterial in the process. As would be obvious, the groups need only be microbiologically non-toxic. Examples include esters of both aliphatic and aromatic, unsubstituted and substituted and monobasic and polybasic carboxylic, phosphoric and sulfonic acids. Preferred are esters of saturated or unsaturated aliphatic, araliphatic and aromatic monocarboxylic acids containing 1-18, preferably 2-12 carbon atoms.

Examples of esterified 8-hydroxy groups are those wherein the acyl group thereof is the acyl radical of, for example, an aliphatic acid containing 1-18, preferably 2-5 carbon atoms, e.g., formic, acetic, propionic, butyric, isobutyric, α-ethylbutyric, valeric, isovaleric, α-ethylvaleric, trimethylacetic, 2-methylbutyric, 3-ethylbutyric, hexanoic, diethylacetic, triethylacetic, enanthic, octanoic, undecylic and palmitic, a cyclic acid, preferably a cycloaliphatic acid, containing, e.g., 5-18 carbon atoms, e.g., cyclopropylideneacetic, cyclobutylcarboxylic, cyclopentylcarboxylic, cyclopentylacetic, β-cyclopentylpropionic, cyclohexyl, cyclohexylacetic and β-cyclohexylpropionic acid; a carbocyclic aryl or alkaryl acid, e.g., containing 6-18 carbon atoms, and 1-5, preferably 1 or 2 rings, e.g., benzoic, 2-, 3-, or 4-methylbenzoic, 2,3-, 2,4-, 2,5-, 2,6-, 3,4- and 3,5-dimethylbenzoic, ethylbenzoic, 2,4,6-trimethylbenzoic, cinnamic and 3-methyl-α-naphthoic acid; an aralkyl acid, e.g., containing 7-18 carbon atoms, e.g., phenylacetic, β-phenylpropionic, diphenylacetic, biphenylacetic and α-naphthylacetic acid; a dibasic acid, e.g., containing 2-18 carbon atoms and 2 or more, preferably 2 acid groups, e.g., succinic, glutaric, α-methylglutaric, β-methylglutaric, β,β-dimethylglutaric, adipic, pimelic and suberic acid; a hydroxy acid, e.g., containing 2-18 carbon atoms and heteroacids containing 0-1 N, S or O hetero atoms, which are preferably ring carbon atoms, in the heterocyclic ring.

Examples of sulfonic acid esters are those of lower alkanesulfonic acid, e.g., methane- and ethane-sulfonic acid, arylsulfonic acids, e.g., benzenesulfonic and p-toluenesulfonic acid and cycloalkanesulfonic and aralkanesulfonic acids.

Examples of etherified hydroxy groups are alkoxy of 1-8 carbon atoms, e.g., methoxy and ethoxy, aralkoxy, e.g, benzyloxy and β-phenylethoxy, aryloxy, e.g., phenoxy, and heterocylooxy, e.g., tetrahydropyranyloxy and tetrahydrofuranyloxy.

The microbiological hydroxylation is carried out according to conventional methods. For example, the most favorable fermentation conditions can be determined by the customary preliminary tests, such as, for example, the selection of the most advantageous nutrient medium, the suitable substrate solvent, the substrate concentration, the fermentation conditions, e.g., temperature, aeration, pH, and the optimum periods for fermentation, substrate addition, and substrate contact with the enzyme of the microorganism, can be determined by analysis, especially thin-layer chromatography, of the fermentation products.

It was found advantageous to employ concentrations of about 50-1000 mg., preferably 80-250 mg. per liter, of a conventional nutrient medium. The pH is preferably adjusted to a value in the range from 5 to 7. The culturing temperature is in the range of 20°-40° C., preferably 25°-35° C. For aeration purposes, approximately 1 liter of air is fed per minute and per liter of culture broth. The conversion of the substrate is suitably monitored by the analysis of sample extracts by thin-layer chromatography. In general, adequate production of hydroxylated benzazocines is achieved within 20-50 hours.

The products of this process are isolated and purified in a conventional manner. For example, the products can be extracted with an organic solvent, e.g., methyl isobutyl ketone, the extract can be evaporated, and the process products can be separated and purified by column chromatography.

The 2,6-methano-3-benzazocines hydroxylated in the 1-position according to the process of this invention can then be structurally modified in the usual manner. For example, the 1-hydroxy group can be oxidized to a keto group. The thus-obtained keto group is reacted with alkyl magnesium halide to produce 1-alkyl-1-hydroxy compounds. The N-benzoyl side chain can be reduced to a benzyl side chain and, if desired, thereafter removed in a conventional manner. The thus-obtained benzazocines with a secondary amino group are amenable to a wide variety of reactions.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

The percentages indicated in the following example are weight per volume.

EXAMPLE

Hydroxylation of (±) 1,2,3,4,5,6-Hexahydro-8-hydroxy-6(α),-11(α)-dimethyl-2,6-methano-3-benzoylbenzazocine with *Pellicularia filamentosa* f. sp. sasakii ATCC 13 289

Two 2-liter Erlenmeyer flasks, each containing 500 ml. of a nutrient solution consisting of:

| glucose | 3 % | $K_2HPO_4$ | 0.2 % |
|---|---|---|---|
| corn steep liquor | 1 % | $MgSO_4$ | 0.05 % |
| $NaNO_3$ | 0.2% | $FeSO_4$ | 0.002% |
| $KH_2PO_4$ | 0.1% | KCl | 0.05 % | were inoculated with the supernatant liquor of a culture of *P. filamentosa* f. sp. sasakii (ATCC 13 289), grown on an agar slant for one to two weeks. After three days of growth on a rotary shaker at 30° C., the mycelium suspension was utilized as inoculum for the inoculation of a 20-liter experimental fermenter charged with 15 l. of a sterilized medium of the same composition. The germination was conducted at 29°C., an aeration rate of 15 liters per minute, and an agitating speed of 220 r.p.m., with the occasional addition of "Silicon SH" as defrother. After a growth period of 12 hours, the substrate was added in the form of a solution, filtered under sterile conditions, of 3 g. of (±) 1,2,3,4,5,6,-hexahydro-8-hydroxy-6(α),11(α)-dimethyl-2,6-methano-3-benzoylbenzazocine in 150 ml. of dimethylformamide. The microbiological conversion of the substrate was monitored by the withdrawal of several samples which were extracted with methyl isobutyl ketone and analyzed by thin-layer chromatography (TLC) on silica gel plates. After development in the system chloroform/methanol (95 + 5) with chamber saturation, the starting material appeared at $R_F = 0.72$ and the primary product appeared at $R_F = 0.38$ when the plate was chlorinated and shortly thereafter sprayed with tolidine reagent. After a contact period of 39-41 hours, the optimum of the conversion was reached, and the fermenter was harvested. The mycelium was filtered off with the addition of "Celite" and washed with methyl isobutyl ketone. The culture filtrate was likewise extracted three times with methyl isobutyl ketone. The combined extracts were concentrated to about one liter in a forced circulation evaporator at 30° C. under vacuum and concentrated to dryness at 40°–50° C. in a rotary evaporator apparatus. The residue was washed twice with 100 ml. portions of hexane to remove adhering silicone oil, and the crude product (3.5 g.) was chromatographed over 350 g. of silica gel with a solvent gradient of: (I) 5 liters of dichloromethane and 5 liters of dichloromethane/acetone (9 + 1); (II) 5 liters of dichloromethane/acetone (9 + 1) and 5 liters of dichloromethane/acetone (8 + 2). In addition to several fractions containing starting material, inherent components, and other conversion products, a fraction containing 600 mg. of the primary metabolite, (±) 1,2,3,4,5,6-hexahydro-1($\beta$),8-dihydroxy-6($\alpha$),11($\alpha$)-dimethyl-2,6-methano-3-benzoylbenzazocine was eluted with This compound can be recrystallized from dichloromethane/isopropyl ether and has a melting point of 191°–193° C.

The preceding examples can be repeated with similar success by substituting the generically of specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of compounds of the formula

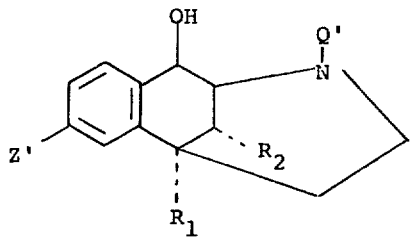

wherein Q' is benzoyl; $R_1$ and $R_2$ each is a hydrogen atom or lower alkyl and Z' is a free, etherified, or esterified hydroxy group, which comprises subjecting a compound of the formula

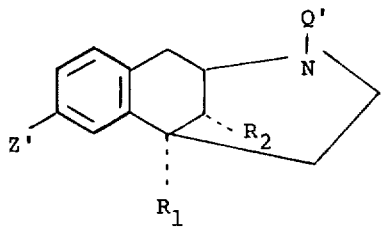

wherein Q', $R_1$, $R_2$, and Z' have the values given above to the hydroxylating activity of a hydroxylating species of the microorganism Pellicularia filamentosa.

2. A process according to claim 1, wherein the microorganism is *P. filamentosa* f. sp. sasakii (ATCC 13 289).

3. A process according to claim 1, wherein Z' is OH.

4. A process according to claim 1, wherein $R_1$ and $R_2$ are $CH_3$.

5. A process according to claim 4, wherein the starting compound is (±) 1,2,3,4,5,6-hexahydro-8-hydroxy-6($\alpha$),11($\alpha$)-dimethyl-2,6-methano-3-benzoylbenzazocine.

6. A process according to claim 5, wherein the microorganism is *P. filamentosa* f. sp. sasakii (ATCC 13 289).

* * * * *